Patented Apr. 19, 1932

1,855,048

UNITED STATES PATENT OFFICE

JULIUS WALTER HAAKE, OF DRESDEN, GERMANY, ASSIGNOR TO THE HENKEL & CIE. GESELLSCHAFT MIT BESCHRANKTER HAFTUNG, OF DUSSELDORF, GERMANY, A CORPORATION OF GERMANY

METHOD OF PREVENTING THE FORMATION OF LUMPS OR CLODS WHEN DISSOLVING STARCH WHICH SWELLS IN COLD STATE

No Drawing. Application filed May 28, 1930, Serial No. 456,798, and in Germany May 31, 1929.

The present invention relates to a method of preventing the formation of lumps or clods when dissolving starch which swells in cold state.

According to the hitherto known methods of producing starch which swells when added to cold water the starch is obtained in the form of flat cakes which are pulverized in suitable grinding mills, as the material is mostly used in the form of a powder. However, such large amounts of starch dust are formed by the grinding that it is impossible to stir the starch with water or other fluids, without the formation of clods. Of course by coarse grinding smaller amounts of dust are produced but in such case the product does not swell rapidly enough and is therefore almost valueless. This disadvantage is recognized and chemical methods of overcoming same are described in the German Patents Nos. 389,023 and 317,409.

According to the present invention the flat cakes of starch are subdivided mechanically in such a manner, that substantially no waste products are produced and an end product is obtained in the form of grains of fixed uniform size. The size of the grains may, according to the invention, be chosen in accordance with the solubility of the product in question and the starch may therefore always be stirred in cold water without the formation of clods, whereby the material will swell rapidly enough for all practical purposes.

Example 1

The cakes of starch are subdivided by passing them between a pair of cooperating rolls which rotate in opposite directions, both of which rolls are equipped with knives or corrugations, which at one roll being arranged parallel to the axis of such roll and the knives or corrugations of the other roll being arranged transversely of the axis of the roll. The size of the grains of starch obtained is dependent upon the distance between the individual knives or corrugations.

Example 2

A starch cake is pressed through a strongly armoured sieve having meshes of the desired size, by means of a strong but elastic pressure, the point at which the pressure is exerted upon the sieve being gradually changed. In this case also the formation of starch dust is prevented and grains are obtained the size of which is dependent upon the area of the meshes of the sieve.

The invention is also applicable to vegetable glues.

I claim:

1. A method of producing swelling starch in a form capable of swelling in cold water to a paste without the formation of clods, said method comprising subdividing cakes of cold water swelling starch into parts of uniform size.

2. A method of producing swelling starch in a form capable of swelling in cold water to a paste without the formation of clods, said method comprising subdividing cakes of cold water swelling starch into parts of uniform size and form.

In testimony whereof I have hereunto set my hand.

JULIUS WALTER HAAKE.